United States Patent Office 2,828,637
Patented Apr. 1, 1958

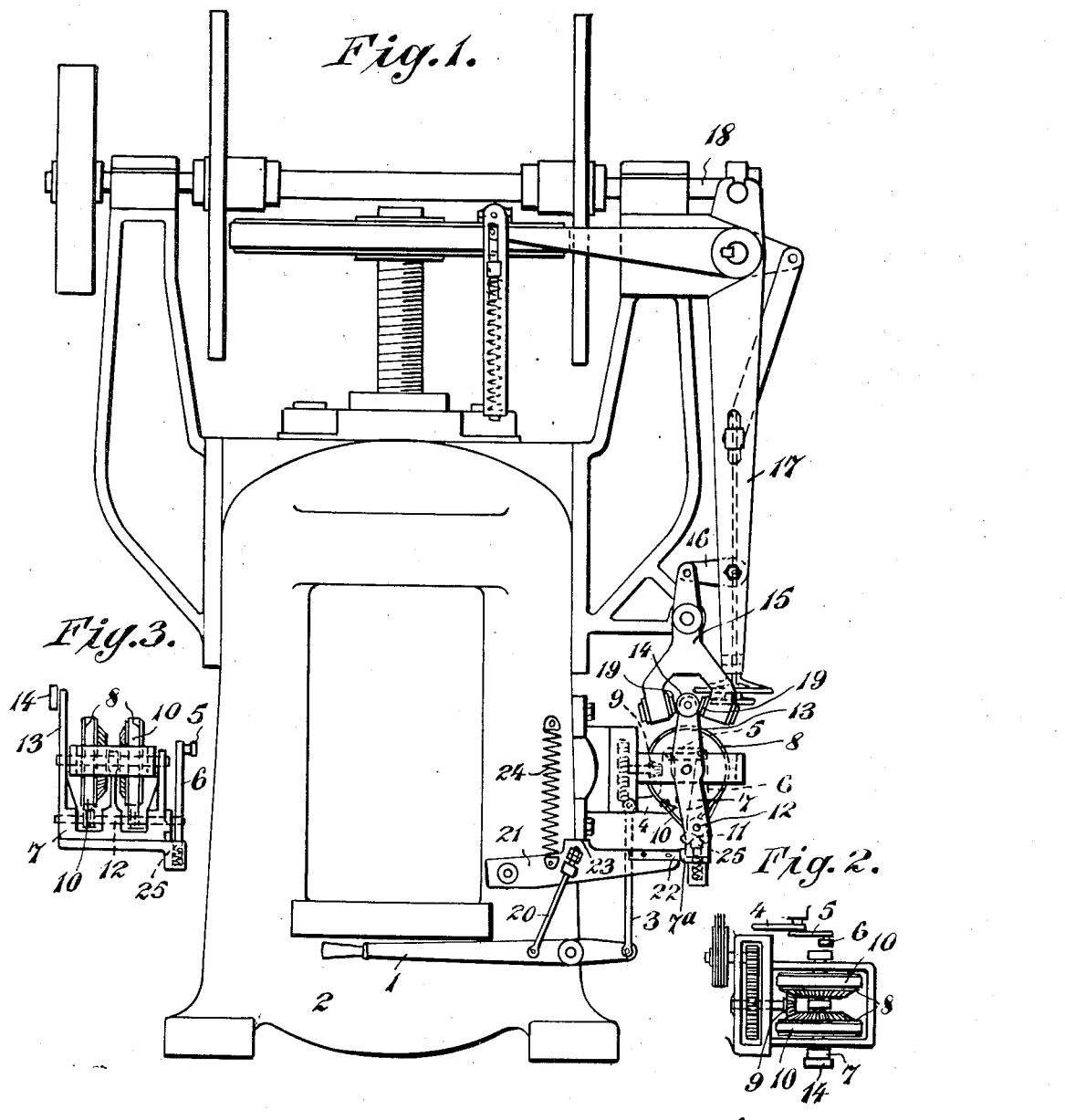

2,828,637

FRICTION DRIVE SCREW PRESSES

John Bernard Challen, Kington Grange, Claverdon, England, assignor to Taylor & Challen Limited, Birmingham, England, a British company Application April 26, 1955, Serial No. 503,995

3 Claims. (Cl. 74—202)

This invention relates to improvements in friction drive screw presses of the kind in which the screw which is normally vertically mounted is connected to a flywheel which is adapted to be driven by peripheral frictional contact with the face of one or other of two friction discs mounted upon an axially slidable shaft, and wherein the shaft is adapted to be moved so as to clutch the frictional disc for the downward or operational stroke of the flywheel by means of a hand lever, which when released admits of the shaft moving automatically or, alternatively combined with a reverse movement of the hand lever to clutch the other friction disc to the flywheel so as to reverse the stroke of the press until the flywheel contacts the brake shoes carried by arms connected to the clutch operating mechanism and thereby automatically disengages the drive for the upward or reverse stroke.

In United States patent application Serial No. 303,246 (which eventuated in United States Patent No. 2,719,434) there is disclosed a friction drive screw press of the aforesaid kind having a resilient coupling between the brake shoes and the clutch engaging mechanism of the press, and also having catch mechanism associated with the hand lever or its linkage, which catch mechanism requires to be manually released before the friction disc for the downward or operational stroke of the press can be engaged with the flywheel, thereby ensuring that a neutral position is achieved after the flywheel has struck the brake shoes, and permitting the brake shoes to carry out their function of keeping the flywheel from being traversed downwardly.

The object of the present invention is to provide power actuated or assisted mechanism for controlling the movement of the axially slidable shaft whilst maintaining the advantages of the friction drive screw press disclosed in the earlier United States application Serial No. 303,246.

The invention consists of a friction drive screw press of the kind referred to embodying a power actuated clutch control mechanism characterised in that a hand lever pivotally connected through linkage to the control shaft of the clutch control mechanism has connected thereto a pivotally mounted catch which prevents the clutch control mechanism from being moved to a position to engage the friction disc to effect a downward travel of the screw until the hand lever has been operated.

A convenient embodiment of the present invention will now be described with reference to the accompanying drawings in which:

Fig. 1 illustrates a front elevation of a press in accordance with the present invention.

Fig. 2 illustrates a plan view of a clutch control mechanism seen in Fig. 1.

Fig. 3 illustrates a side elevation of a clutch control mechanism seen in Fig. 1.

Figure 4:
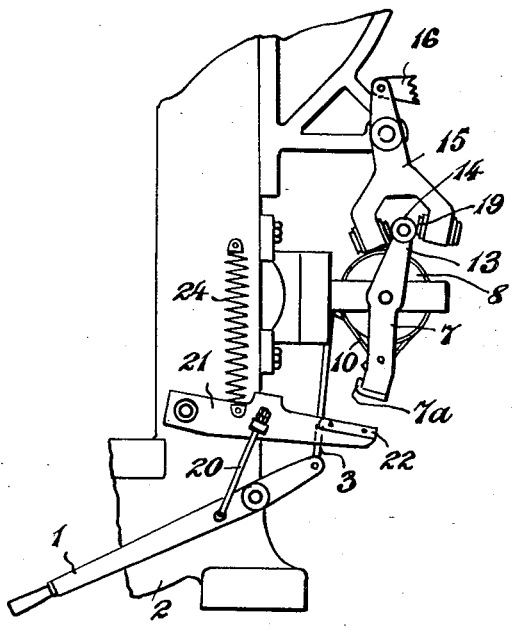
Fig. 4 is a fragmentary front elevation illustrating part of the mechanism seen in Fig. 1 in the position necessary for the down stroke of the press.

The press mainly follows the construction disclosed in the specification of United States application Serial No. 303,246 insofar as it concerns the screw with flywheel, the axially movable shaft, the two friction discs thereon, and the double lever having a bifurcated upper end to engage trunnions on the axially slidable shaft. The double lever is rocked to engage one or other of the friction discs with the flywheel or maintained in a midway setting to provide for a neutral position of the press by the following generally known power actuated clutch control mechanism.

A hand lever 1 is pivoted on the frame 2 of the press and is connected by a link 3 to the one arm of a bell crank lever 4 pivoted on the frame of the press, the opposite end whereof is pivotally connected by a link 5 to a radial arm 6 on the control shaft of a power actuated clutch control mechanism. This power actuated clutch control mechanism comprises a body or frame 7 which is rockable about an axis coincident with the axis of rotation of the two positively rotated clutch drums 8 mounted within the said body. The pair of clutch drums 8 are rotated in opposite directions at the same speed by means of a bevel pinion 9 which is driven from an electric motor (not shown) and each clutch drum is surrounded by a flexible friction clutch band 10 the one end of which is rigidly secured to the frame 7 whilst the other end is connected to a laterally extending arm or boss 11 on the control shaft 12 which is also journalled within the frame 7. The arrangement is such that rotation of the control shaft 12 in one direction tightens the one friction clutch band upon its associated clutch drum, and thus causes a rocking of the frame 7 in one direction, whilst rotation of the control shaft 12 in the opposite direction tightens the other friction clutch band upon its associated clutch drum, and thus causes rocking of the frame 7 in the opposite direction.

The body has at one side an integral upwardly directed portion 13 upon which is mounted a roller 14 which is disposed between the limbs of a lever 15 of substantially inverted Y shape which is pivoted on the frame of the press and is pivoted at its upper end to the one end of a link 16, the opposite end of which is connected to the double lever 17 having a bifurcated upper end engaging trunnions on the axially slidable shaft 18.

Each limb of this inverted Y shaped lever accommodates a spring loaded plunger 19, the end of which projects inwardly and bears upon the roller 14 on the body of the power actuated clutch control mechanism; the purpose of these plungers 19 being to minimise shock being transmitted to the mechanism on the initial actuation of the clutch control mechanism.

A spring-loaded plunger 25 having a wedge shaped nose which co-operates with a V notch in the radial arm 6 normally locates the brake bands in the neutral position.

According to the present invention in order to ensure that when the screw is traversed upwardly and the flywheel strikes the brake shoes the mechanism for downward travel of the screw is not re-engaged, the hand lever 1 is connected by a link 20 permitting of a limited lost motion to a lever 21 pivotally mounted on the frame of the press and having a nose 22 which is adapted to abut against a renewable striker plate 7a provided on the frame 7 of the clutch control mechanism, when the said body is in the neutral position of the press as seen in Fig. 1. The lever 21 is upwardly urged to abut against a stop 23 on the frame by a tension spring 24. It will be appreciated that the lever 21 will effectively prevent the rocking of the body in a direction to engage the friction disc for the downward travel of the screw until the hand lever is manually depressed, it being understood that depression of the hand lever 1, through the link 20 removes the nose 22 of the lever 21 from engagement with the plate 7a on the frame 7 to admit of a rocking movement of the clutch control mechanism into the position necessary for the down stroke of the press, as illustrated by Fig. 4.

I claim:

1. In a friction drive screw press having a frame with a screw threaded therein, said screw carrying a wheel positioned between parallel coaxial friction discs, said wheel having a friction tread engageable by either of said discs to move said wheel perpendicularly with respect to the axis of said discs, in combination, power operable mechanism for shifting said friction discs axially, said power operable mechanism having a pivoted member which when swung in one direction causes one of said discs to engage said friction tread to move said screw downwardly and when swung in the opposite direction causes the other of said discs to engage said friction tread to move said screw upwardly, latch means for limiting the swinging of said pivoted member in the direction to cause one of said discs to engage said friction tread to move said screw downwardly, a spring yieldably holding said latch means in position to engage said pivoted member, and manually operable means for withdrawing said latch means from position to engage said pivoted member.

2. In a friction drive screw press having a frame with a screw threaded therein, said screw carrying a wheel positioned between parallel coaxial friction discs, said wheel having a friction tread engageable by either of said discs to move said wheel perpendicularly with respect to the axis of said discs, in combination, power operable mechanism for shifting said friction discs axially, said power operable mechanism having a pivoted member which when swung in one direction causes one of said discs to engage said friction tread to move said screw downwardly and when swung in the opposite direction causes the other of said discs to engage said friction tread to move said screw upwardly, latch means for limiting the swinging of said pivoted member in the direction to cause one of said discs to engage said friction tread to move said screw downwardly, a spring yieldably holding said latch means in position to engage said pivoted member, manually operable means for withdrawing said latch means from position to engage said pivoted member, said power operable mechanism having a control for determining the direction in which said pivoted member is swung, said manually operable means being operatively connected to said control.

3. In a friction drive screw press having a frame with a screw threaded therein, said screw carrying a wheel positioned between parallel coaxial friction discs, said wheel having a friction tread engageable by either of said discs to move said wheel perpendicularly with respect to the axis of said discs, in combination, power operable mechanism for shifting said friction discs axially, said power operable mechanism having a pivoted member which when swung in one direction causes one of said discs to engage said friction tread to move said screw downwardly and when swung in the opposite direction causes the other of said discs to engage said friction tread to move said screw upwardly, latch means for limiting the swinging of said pivoted member in the direction to cause one of said discs to engage said friction tread to move said screw downwardly, a spring yieldably holding said latch means in position to engage said pivoted member, manually operable means for withdrawing said latch means from position to engage said pivoted member, said power operable mechanism having a control for determining the direction in which said pivoted member is swung, said manually operable means being operatively connected to said control, there being a lost motion connection between said manually operable means and said latch means to prevent said manually operable means from being so moved as to cause said pivoted member to be swung in a direction which would result in downward movement of said screw without first withdrawing said latch means from engagement with said pivoted member but to permit said manually operable means to be so moved as to cause said pivoted member to be swung in the opposite direction.

References Cited in the file of this patent

UNITED STATES PATENTS

| 1,614,001 | Hofstad | Jan. 11, 1927 |
| 1,783,115 | Georg | Nov. 25, 1930 |
| 2,719,434 | Challen | Oct. 4, 1955 |